United States Patent Office 3,317,280
Patented May 2, 1967

3,317,280
PREPARATION OF HYDROGEN PEROXIDE
Ray S. Long, Concord, and Amy T. Noma, Berkeley, Calif., assignors to The Dow Chemical Company, Midland, Mich., a corporation of Delaware
No Drawing. Filed Dec. 12, 1963, Ser. No. 330,004
4 Claims. (Cl. 23—207)

This invention relates to the preparation of hydrogen peroxide and more particularly is concerned with an improved process for recovering hydrogen peroxide from an oxidized alkali metal amalgam.

The oxidation of alkali metal amalgams, paticularly sodium and potassium amalgam, to the corresponding alkali metal peroxide is understood in the art. However, heretofore recovery of the so-produced alkali metal peroxide values as hydrogen peroxide by direct extraction of the oxidized amalgam with aqueous acid has not been successful primarily because of the instability of the hydrogen peroxide in aqueous acid in the presence of coextracted heavy metal cations.

It is a principal object of the present invention to provide a novel process for recovering hydrogen peroxide from oxidized alkali metal amalgam.

It is another object of the present invention to provide a method for recovering hydrogen peroxide from sodium or potassium peroxide in the presence of heavy metal cations without detrimental decomposition of the hydrogen peroxide.

It is a further object of the present invention to provide a novel process for recovering hydrogen peroxide directly from oxidized sodium or potassium amalgams in high yields.

It is also an object of the present invention to provide a novel process for preparing hydrogen peroxide from oxidized sodium or potassium amalgam by treatment with an acidic organic extractant.

These and other objects and advantages readily will become apparent from the detailed description presented hereinafter.

The present process comprises treating sodium or potassium peroxide, prepared by direct oxidation of the corresponding amalgam, with a mineral acid carried in an organic solvent thereby to convert the alkali metal peroxide into hydrogen peroxide ($H_2O_2$) and at the same time preferentially extracting the so-produced hydrogen peroxide into the organic phase. The hydrogen peroxide product can be recovered from the organic extract by water stripping or other separation techniques.

More particularly in accordance with the present process sodium or potassium peroxide is produced by contacting the corresponding amalgam, containing as a maximum about 0.2 weight percent of the alkali metal with substantially dry air, oxygen or mixtures thereof at a temperature below about 60° C. for a maximum period of time of about 5 minutes. Preferably sodium amalgam is employed.

The oxidized amalgam having either the so-produced sodium or potassium peroxide in the presence of excess mercury is extracted in accordance with the present invention with a mineral acid, preferably phosphoric, hydrochloric, sulfuric acid or mixtures thereof carried in an aliphatic alcohol having from 1 to about 6 carbon atoms, aliphatic carboxylic esters having from about 2 to about 4 carbon atoms, aliphatic ketones having from 1 to about 4 carbon atoms, trialkyl phosphates wherein each of the alkyl groups has from about 4 to about 8 carbon atoms, di- and trialkyl amines wherein each of the alkyl groups has from about 8 to about 12 carbon atoms.

Particularly suitable organic solvents for use as carrier for the mineral acid and $H_2O_2$ extractant in the present improved process are n-butanol, methyl isobutyl ketone, n-butyl acetate, ethyl acetate, tributyl phosphate, trioctyl phosphate, iso-amyl alcohol, iso-butyl alcohol, tetrabromoethane, tri-isooctyl amine and di-dodecyl amine.

Preferably substantially water immiscible organic liquids, e.g. the trialkyl phosphates, will be employed as solvent for the mineral acid to facilitate subsequent recovery of the hydrogen peroxide product by water stripping.

The use of the acid-organic liquid extractant unexpectedly provides for conversion of the alkali metal peroxide into hydrogen peroxide in good yield as well as giving simultaneous extraction of the hydrogen peroxide into the organic phase without detrimental product decomposition.

The so-produced and extracted hydrogen peroxide is recoverable from the organic extract by water stripping or other separation techniques. Water stripping is particularly effective for those organic liquids which are essentially water immiscible or only slightly miscible with water. With these substances ordinarily the amount of water for stripping ranges from about 0.2 to about 5 times that of the organic phase. These values, however, are not limiting as higher or lower ratios of water may be employed.

The concentration of acid to be employed in the organic extract ranges from about 5 to about 70 weight percent. The actual concentration for optimum hydrogen peroxide conversion and recovery readily is determined for any particular organic solvent-mineral acid solution employed.

The amount of the acid-organic liquid extractant to be employed is not critical although ordinarily an amount of solution sufficient to provide at least enough acid to convert substantially all of the alkali metal peroxide to hydrogen peroxide is used. Preferably, an amount of organic solution to provide an excess of the acid component over that required for $H_2O_2$ production is employed. Large excesses of the conversion-extractant solution usually are not used because of the inconvenience in handling large volumes of liquid and the subsequent stripping of the hydrogen peroxide therefrom.

The treatment of the oxidized amalgam by the acidic organic extractant can be carried out in continuous, cyclic or batch-type operations.

The following examples will serve to further illustrate the present invention but are not meant to limit it thereto.

*Example 1.*—A dry, medium porosity sintered glass funnel about 5¾ inches high and having a 1¾ inch inside diameter was fitted with a No. 10 rubber stopper which had been bored to receive a gas outlet tube. The funnel was connected at the stem through a flow meter and a calcium chloride drier to an oxygen cylinder. The funnel was unstoppered, charged with about 295.6 grams of a substantially dry sodium amalgam (0.043 weight percent sodium) and restoppered. Oxygen gas at about 10 pounds per square inch gauge regulator pressure and about room temperature, i.e. from about 18 to about 25° C., was bubbled through the amalgam with swirling for about 3 minutes at a flow rate of about 4500 cubic centimeters per minute. During this early part of the reaction period, the mass foamed. By the end of the 3 minutes time period, the foaming essentially had ceased and the oxidized amalgam began to "peel" away from the funnel wall.

The resulting oxidized amalgam was agitated for several minutes with about 20 milliliters of a solution of sulfuric acid in tributyl phosphate.

Two-phase titration of an aliquot of the resulting tributyl phosphate extract with thiosulfate showed conversion of sodium peroxide into hydrogen peroxide and extraction of the hydrogen peroxide into the tributyl phosphate in a yield of about 71.8 percent based on the sodium content of the amalgam.

The acidic tributyl phosphate reactant-extractant solution was prepared by contacting for several minutes about equal volumes of tributyl phosphate and aqueous sulfuric acid solution containing about 32 percent by weight $H_2SO_4$. This action gave extraction of $H_2SO_4$ into the alkyl phosphate after which the resulting acid containing organic solution was separated from the $H_2SO_4$-depleted residual aqueous mass.

*Example 2.*—In a continuous operation, a sodium amalgam, containing about 0.046 percent sodium, was pumped at a rate of about 150 grams per minute by means of a Teflon fluorocarbon bellows pump from a 500 milliliter reservoir into an oxidizer unit along with simultaneous introduction of a countercurrent flow of substantially dry oxygen at a flow rate of about 4500 cubic centimeters per minute.

The oxidizer unit consisted of a jacketed, horizontal glass cylinder in which a close-fitted parallel array of toothed vertically positioned Teflon discs was rotated axially at about 850 revolutions per minute.

The oxidized amalgam stream was percolated downward through a 0.5 inch inside diameter by about 12 inches long glass column packed with glass helices. The top of this column was connected directly to the outlet of the oxidizer. As the oxidized amalgam, containing $Na_2O_2$, passed down through the column it contacted a solution of HCl in tributylphosphate which was being passed in countercurrent flow through the column at a rate of about 10 cubic centimeters per minute. The acidic tributyl phosphate reactant was prepared by precontacting tributyl phosphate for about 2 minutes with an equal volume of about 4 N hydrochloric acid.

The tributyl phosphate effluent stream from the column was continuously recycled. Analysis of the effluent stream after about 40 minutes of operation showed the hydrogen peroxide content of the effluent was about 0.1 N ($H_2O_2$). This indicated about a 71.2 yield and recovery of $H_2O_2$ based on the sodium content of the amalgam charged.

*Example 3.*—A number of tests were run to determine the effectiveness of water stripping to recover hydrogen peroxide from an acidic tributyl phosphate solution.

For this study hydrogen peroxide was added to an $H_2SO_4$-tributyl phosphate solution to provide an acid organic extract which was about 0.68 N in $H_2O_2$. Individual portions of this solution were extracted with a predetermined amount of water and the peroxide content of the resulting aqueous phase determined by direct titration.

Table I which follows shows the results obtained for a number of runs employing various water-acid tributyl phosphate solution ratios.

TABLE I

| Run No. | Stripping Results | |
|---|---|---|
| | Phase Proportion $H_2O$/Tributyl Phosphate Solution | Hydrogen Peroxide Stripped From Organic Phase, Percent |
| 1 | 1/5 | 19.7 |
| 2 | 1/3 | 30.0 |
| 3 | 1/2 | 46.2 |
| 4 | 1/1 | 61.2 |
| 5 | 2/1 | 73.3 |
| 6 | 5/1 | 92.1 |

*Example 4.*—Sodium peroxide was prepared by treating about 320 grams of amalgam having about 0.06 percent sodium with substantially dry oxygen at a flow rate of about 4500 cubic centimeters per minute for about 2 minutes in the apparatus and in accordance with the procedure described in Example 1.

A number of runs were made wherein fresh batches of the resulting oxidized amalgam were agitated with about 20 milliliters of $H_2SO_4$-tributyl phosphate solution of a predetermined $H_2SO_4$ concentration, and the organic extract analyzed for $H_2O_2$ as described in Example 1.

The results of these tests are summarized in Table II which follows:

TABLE II

| Run No. | Percent $H_2SO_4$ Contacted With Tributyl Phosphate | $H_2O_2$ Produced and Extracted into Organic Phase, Percent Yield |
|---|---|---|
| 1 | 5 | 7.34 |
| 2 | 10 | 7.37 |
| 3 | 20 | 13.4 |
| 4 | 32 | 34.2 |
| 5 | 40 | 28.2 |
| 6 | 50 | 34.1 |
| 7 | 70 | 15.7 |

In a similar study using tributyl phosphate which had been precontacted with HCl results as shown in Table III were obtained.

TABLE III

| Run No. | Normality of HCl Contacted with Tributyl Phosphate N | $H_2O_2$ Produced and Extracted into Organic Phase, Percent Yield |
|---|---|---|
| 1 | 4 | 27.2 |
| 2 | 5 | 27.1 |
| 3 | 8 | 21.2 |
| 4 | 12 | 11.7 |

*Example 5.*—Using the same apparatus and process as described for Example 1, about 300 grams of sodium amalgam containing about 0.05 mol percent sodium was treated for about 2 minutes with substantially dry oxygen at a flow rate of about 4500 cubic centimeters per minute. The resulting oxidized amalgam was extracted with 20 milliliters of a n-butyl alcohol solution of HCl, prepared by contacting n-butyl alcohol with HCl of a predetermined normality in either a 1/1 or 2/1 volume ratio. Table IV presents the results of a number of runs showing $H_2O_2$ production and recovery for various normalities of acid.

TABLE IV

| Run No. | Normalities of HCl Precontacted with n-butyl Alcohol | Precontact n-butyl/HCl Alcohol Volume Ratio | Yield $H_2O_2$ in n-butyl Alcohol Solution, percent |
|---|---|---|---|
| 1 | 2 | 1/1 | 23 |
| 2 | 4 | 2/1 | 31 |
| 3 | 12 | 10/1 | 21 |

In a manner similar to that described for the foregoing examples, trioctyl phosphate was precontacted with a sulfuric acid solution containing about 5% $H_2SO_4$ and this acidic organic solution used to recover $H_2O_2$ from an oxidized sodium amalgam. Similarly a tributyl phosphate solution precontacted with phosphoric acid of from about 10 to about 60 percent $H_3PO_4$ was found to successfully convert sodium peroxide or potassium peroxide from the corresponding oxidized amalgam into hydrogen peroxide as well as to extract the so-produced hydrogen peroxide into the tributyl phosphate extractant.

Also, solutions of $H_3PO_4$ in tributyl phosphate, HCl in ethyl acetate, butyl acetate, tributyl phosphate, n-butanol, or methyl isobutyl ketone, $H_2SO_4$ in tributyl phosphate or n-butanol, and the like, can be employed in the present process to convert $Na_2O_2$ and $K_2O_2$ present in the corresponding oxidized sodium and potassium amalgams to hydrogen peroxide with simultaneous extraction of the so-produced $H_2O_2$ into the organic solution.

The actual recovery of hydrogen peroxide by the present improved process is related directly to the amount of peroxide produced from the amalgam during the oxidation stage. Therefore, the total product yield in turn is determined primarily by the oxidation times, amount of alkali metal present in the amalgam, and the like variables which directly affect the amalgam oxidation. Substantially all of the peroxide produced during the oxidation of the amalgam is extracted into the acidic organic extractant in accordance with the present novel process.

Various modifications of the present invention can be made without departing from the spirit or scope thereof for it is understood that we limit ourselves only as defined in the appended claims.

We claim:
1. In a process for preparing hydrogen peroxide by acidification of an alkali metal peroxide selected from the group consisting of sodium peroxide and potassium peroxide, said alkali metal peroxide being prepared by direct oxidation of the corresponding amalgam, the improvement which comprises;
   (a) contacting said alkali metal peroxide with a solution of a mineral acid in a trialkyl phosphate liquid organic solvent therefor, said mineral acid being a member selected from the group consisting of phosphoric acid, hydrochloric acid, sulfuric acid and mixtures thereof and each of the alkyl groups of said trialkyl phosphate having from about 4 to about 8 carbon atoms, thereby converting said alkali metal peroxide to hydrogen peroxide and extracting said hydrogen peroxide into said trialkyl phosphate,
   (b) separating the hydrogen peroxide containing organic extract from the residual amalgam, and
   (c) water stripping said hydrogen peroxide from said organic extract.

2. In a process for preparing hydrogen peroxide by acidification of sodium peroxide, said sodium peroxide being prepared by direct oxidation of a sodium amalgam containing a maximum of about 0.2 weight percent sodium with a stream of substantially dry oxygen at about room temperature for a maximum of about three minutes, the improvement which comprises;
   (a) agitating the oxidized amalgam with a solution of $H_2SO_4$ in tributyl phosphate thereby to convert said sodium peroxide to hydrogen peroxide and to extract said hydrogen peroxide into said tributyl phosphate solution, said $H_2SO_4$-tributyl phosphate solution prepared by precontacting an aqueous sulfuric acid of from about 5 to about 70 percent by weight $H_2SO_4$ with said tributyl phosphate thereby to extract said $H_2SO_4$ into said butyl phosphate, and
   (b) water stripping said hydrogen peroxide from said tributyl phosphate, at a water/tributyl phosphate volume ratio of about 0.2 to about 5.

3. The process as defined in claim 2 and including the step of precontacting about equal volumes of tributyl phosphate and aqueous sulfuric acid containing about 32 percent by weight thereby to extract $H_2SO_4$ into said tributyl phosphate, separating said $H_2SO_4$ containing tributyl phosphate and said $H_2SO_4$ depleted aqueous solution and agitating said precontacted $H_2SO_4$-tributyl phosphate solution with the oxidized sodium amalgam.

4. In a process for preparing hydrogen peroxide by acidification of sodium peroxide, said sodium peroxide being prepared by direct oxidation of a sodium amalgam containing a maximum of about 0.2 weight percent sodium with a stream of substantially dry oxygen at about room temperature for a maximum of about 3 minutes the improvement which comprises;
   (a) agitating the oxidized amalgam with a solution of HCl in tributyl phosphate thereby to convert said sodium peroxide to hydrogen peroxide and to extract said hydrogen peroxide into said tributyl phosphate solution, said HCl-tributyl phosphate solution prepared by precontacting an aqueous hydrochloric acid of from about 3 to about 12 N HCl with said tributyl phosphate thereby to extract said HCl into said tributyl phosphate, and
   (b) water stripping said hydrogen peroxide from said tributyl phosphate at a water/tributyl phosphate volume ratio of from about 0.2 to about 5.

References Cited by the Examiner

UNITED STATES PATENTS

| | | | |
|---|---|---|---|
| 1,627,325 | 5/1927 | Halvorsen | 23—207 |
| 2,083,691 | 6/1937 | Cunningham | 23—207 |
| 2,537,655 | 1/1951 | Dawsey et al. | 23—207 |

OSCAR R. VERTIZ, *Primary Examiner.*

MILTON WEISSMAN, *Examiner.*

H. S. MILLER, *Assistant Examiner.*